F. W. T. KOPSCH.
DEVICE FOR TURNING THE SWINGING AXLES OF FLAPPING WINGS.
APPLICATION FILED JAN. 28, 1909.

935,262.

Patented Sept. 28, 1909.

UNITED STATES PATENT OFFICE.

FRIEDRICH WILHELM THEODOR KOPSCH, OF WILMERSDORF, NEAR BERLIN, GERMANY.

DEVICE FOR TURNING THE SWINGING AXLES OF FLAPPING WINGS.

935,262.  Specification of Letters Patent. Patented Sept. 28, 1909.

Application filed January 28, 1909. Serial No. 474,708.

*To all whom it may concern:*

Be it known that I, FRIEDRICH WILHELM THEODOR KOPSCH, a subject of the King of Prussia, and a resident in the city of Wilmersdorf, near Berlin, Kingdom of Prussia, and German Empire, have invented a certain new and useful Device for Turning the Swinging Axles of Flapping Wings, of which the following is a specification.

The invention refers to improvements in flying apparatus with flapping wings of which the axle can turn so that the wings are able to flap toward all directions, and consists in novel devices for turning the axle in order to allow the wings of the left and of the right side to be differently adjusted and then to be fixed in their positions by a safety-stop.

The mechanism consists in three parts for every single wing: 1. a Cardan link; 2. a device for turning this link; 3. a ring, pivoted on the longitudinal axle of the wing which is handled by the power for moving the wing up and down.

Figure 1:
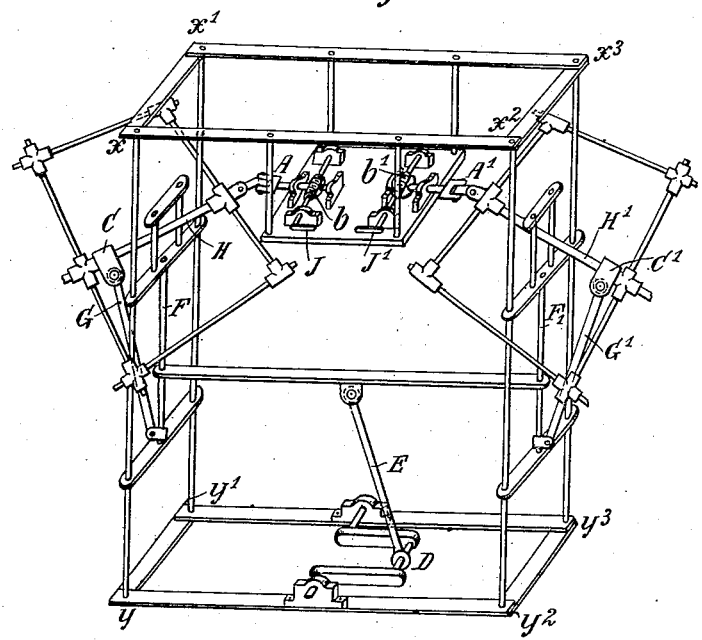
Figure 2:
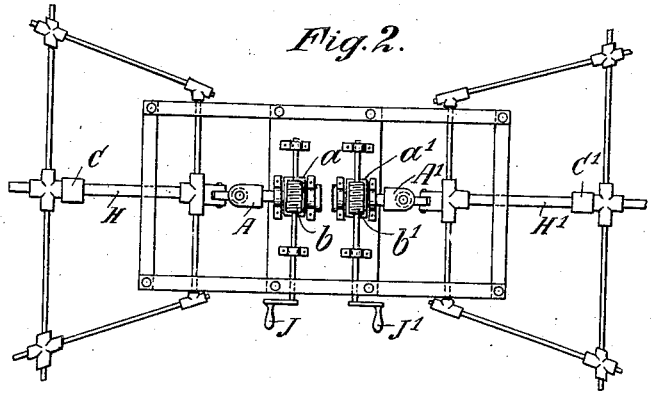

In the accompanying drawing: Figure 1 is a perspective view of my improved device, and Fig. 2 a plan thereof.

A suitable motor, (not shown), moves by means of the crank shaft D, and the connecting-rod E the sledges F, F′ which are slid up and down on the four upright posts of the frame $x, x', x'', x''', y, y, y', y'', y'''$.

The connecting-rods G, G′ fastened to the sledges F, F′, transmit the movement to the axles H, H′ of the wings by means of the rings C, C′. The rings C and C′ are pivoted on the axles H, H′. The axles themselves are fixed to the frame by means of the Cardan links or universal joints A, A′ and can separately be turned or set upon the longitudinal axle of each by means of a worm shaft $b, b'$ and worm wheel $a, a'$ operated by the crank J, J′.

What I claim and desire to secure by Letters Patent of the United States is:—

1. A device of the character described, comprising an oscillative wing, an axle, an intervening universal joint, and means for setting the axle.

2. A device of the character described, comprising a pair of oscillative wings, a pair of axles, intervening universal joints, and means for independently setting the axles.

3. A device of the character described, comprising an oscillative wing, an axle, an intervening universal joint, a worm wheel on the axle, and a worm shaft engaging said wheel.

4. A device of the character described, comprising a reciprocative sledge, an oscillative wing operatively connected thereto, an axle, a universal joint intermediate wing and axle, and means for setting the axle.

In testimony whereof I affix my signature in presence of two witnesses.

FRIEDRICH WILHELM THEODOR KOPSCH.

Witnesses:
 WOLDEMAR HAUPT,
 HENRY HASPER.